United States Patent [19]

Mukai et al.

[11] Patent Number: 5,182,672
[45] Date of Patent: Jan. 26, 1993

[54] FINDER OPTICAL SYSTEM

[75] Inventors: Hiromu Mukai, Kawachinagano; Yasumasa Sugihara, Sakai, both of Japan

[73] Assignee: Minolta Camera Co., Ltd., Osaka, Japan

[21] Appl. No.: 730,546

[22] Filed: Jul. 16, 1991

[30] Foreign Application Priority Data

Jul. 17, 1990 [JP] Japan ................................. 2-189131
Jul. 17, 1990 [JP] Japan ................................. 2-189132
Jul. 17, 1990 [JP] Japan ................................. 2-189133

[51] Int. Cl.⁵ .................................................. G01B 3/02
[52] U.S. Cl. ............................... 359/652; 259/653; 259/654; 259/655
[58] Field of Search .................. 359/682, 653, 654, 655

[56] References Cited

U.S. PATENT DOCUMENTS

| | | | |
|---|---|---|---|
| 4,291,945 | 9/1981 | Hayamizu | 359/834 |
| 4,723,843 | 2/1988 | Zobel | 359/435 |
| 4,730,905 | 3/1988 | Takada | 359/645 |
| 4,905,082 | 2/1990 | Nishigaki et al. | 358/98 |

FOREIGN PATENT DOCUMENTS 61-126515  6/1986  Japan.
2-74936  3/1990  Japan.

*Primary Examiner*—Constantine Hannaher
*Assistant Examiner*—Don Wong
*Attorney, Agent, or Firm*—Price, Gess & Ubell

[57] ABSTRACT

A finder optical system provided separately from a photo-taking lens comprises, from the object side: an object lens from forming a primary image which is an inverted image of an object and for erecting the primary image to form an erecting image; and an eyepiece for enlarging said erecting image. The object lens comprises a gradient index lens.

15 Claims, 7 Drawing Sheets

FINDER OPTICAL SYSTEM

BACKGROUND OF THE INVENTION

1. Field of the Invention

The present invention relates to a finder optical system, and more particularly, to a real-image type finder optical system employed for a lens shutter camera, etc.

2. Description of the Prior Art

FIG. 1 shows a conventionally known real-image type finder optical system. According to the finder optical system, first, a primary image 30 is formed in the vicinity of a positive first condenser lens 20 by an object lens 100 consisting of a positive and a negative lens elements. A secondary image 60 is formed in the vicinity of a positive second condenser lens 50 by a positive relay lens 45 arranged behind the primary image 30. The relay lens 45 erects the primary image 30 which is inverted upside down and leftside right to form an erecting image. The secondary image 60 is enlarged by a positive eyepiece 70 and viewed by a pupil 80.

A relay part where the relay lens 45 is arranged occupies a large part of the finder optical system. The length of the relay part, that is, a distance L between the primary image 30 and the secondary image 60 is shortest when the relay magnification is 1×, and a relation of $L=4f_R$ (where $f_R$ represents the focal length of the relay lens 45 is satisfied. Therefore, if the focal length $f_R$ of the relay lens 45 is reduced, the length L of the relay part is decreased, so that the finder optical system becomes compact.

However, in order to reduce the focal length $f_R$ of a conventional lens having curved surfaces as shown in FIG. 1, the radius of curvature of the lens has to be decreased. Since the variation in aberration increases when the radius of curvature is small, it is usually considered that the limit for the focal length $f_R$ to be reduced to is approximately 15 mm. In other words, approximately 60 mm to 100 mm is required for the length L of the relay part. Therefore, it is difficult to reduce the length L of the relay part while maintaining a required optical performance, and consequently, it is inevitable that the length of the finder optical system increases.

On the other hand, as an optical systems which inverts an image upside down and leftside right, an optical system is also known where a reflecting surface (reflecting even times at the up and down sides and the left and right sides, respectively) such as a Porro prism, etc. is employed in place of the above-described relay lens. However, the Porro prism requires a large space for providing the reflecting surface, etc., it is inevitable that the length of the finder optical system increases, similarly to the case where the relay lens is employed.

SUMMARY OF THE INVENTION

An object of the present invention is to provide a finder optical system where the length along the optical axis is satisfactorily short while a required performance is maintained.

In a finder optical system according to the present invention, an object lens, or image reversing means, or an object lens which also serves as the image reversing means is constituted by a gradient index lens in order to attain the above object.

BRIEF DESCRIPTION OF THE DRAWINGS

These and other objects and features of this invention will become clear from the following description taken in conjunction with the preferred embodiments with reference to the accompanied drawings in which.

DETAILED DESCRIPTION OF THE PREFERRED EMBODIMENTS

Firstly, a description of a gradient index lens (hereinafter referred to as GRIN lens) employed for the present invention will be given. The GRIN lens employed for the present invention is a radial GRIN lens where the refractive index varies in a direction perpendicular to the optical axis.

The refractive index distribution of the above-mentioned GRIN lens is defined by the following equation:

$$n(r) = n_0(1 - Ar^2/2),$$

wherein:
r represents a radial distance from the optical axis;
n(r) represents a refractive index at a distance r;
$n_0$ represents a refractive index along the optical axis; and
A represents the gradient index constant.

Moreover, the focal length f of the GRIN lens is depicted by the following equation:

$$f = 1/[n_0 \cdot A^{\frac{1}{2}} \cdot \sin(A^{\frac{1}{2}} \cdot Z)] \qquad (1),$$

where Z represents a length of the GRIN lens (hereinafter referred to as lens length).

Since the focal length f of the GRIN lens is decided by the lens length Z as described above, the focal length f can arbitrary be varied only by varying the lens length Z. Furthermore, the variation in aberration is small even if the focal length f is varied. That is, it becomes possible to vary the focal length f while maintaining a required optical performance.

A more detailed description will be given.

Figure 2:
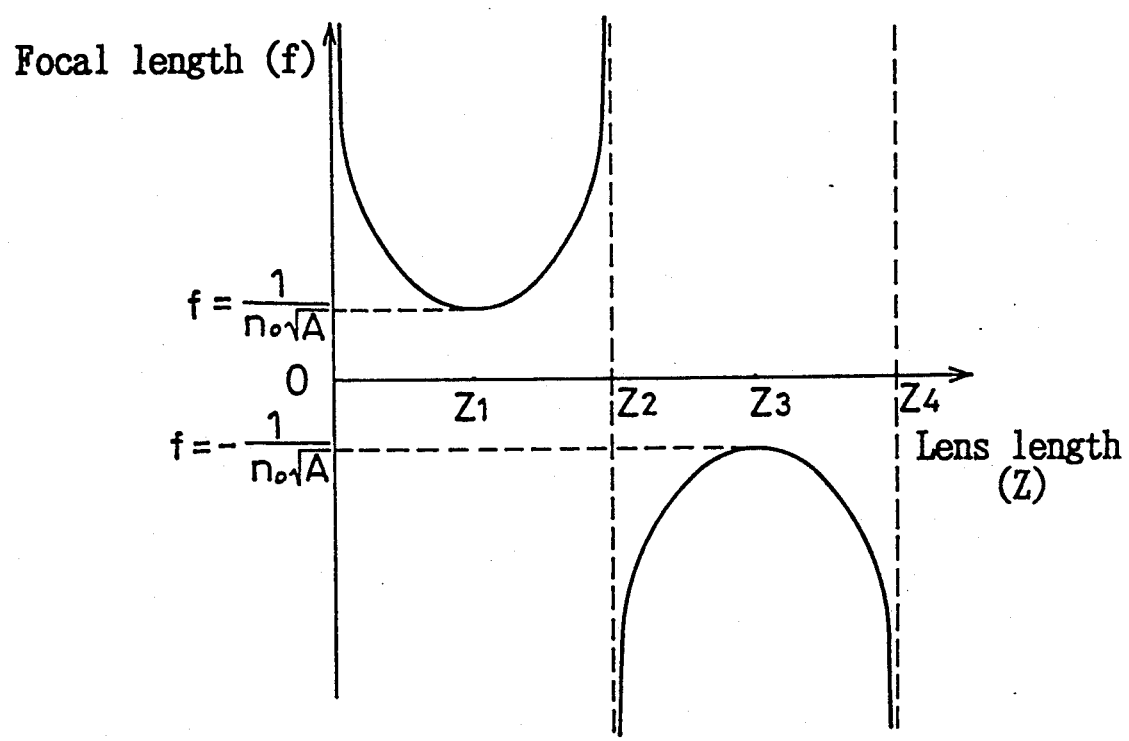
FIG. 2 shows the relation between the lens length and the focal length of a GRIN lens employed for the present invention.

FIG. 2 shows the relation between the lens length Z and the focal length f of the GRIN lens, where the value $(A^{\frac{1}{2}} \cdot Z)$ in the sin function is 0, $\pi/2$, $\pi$ and $3\pi/2$ when Z is $Z_1 = \pi/(2 \cdot A^{\frac{1}{2}})$, $Z_2 = \pi/A^{\frac{1}{2}}$, and $Z_3 = 3\pi/(2 \cdot A^{\frac{1}{2}})$, respectively. Therefore, when the lens length is within a range of $0 < Z < Z_2$, the lens has a positive refractive power, and when $Z = Z_1$, the focal length is $f = 1/(n_0 \cdot A^{\frac{1}{2}})$ which is smallest. On the contrary, when the lens length is within a range of $Z_2 < Z < Z_4$, the lens has a negative refractive power, and when $Z = Z_3$, the focal length is $f = -1/(n_0 \cdot A^{\frac{1}{2}})$ which is the largest.

From the relation shown in FIG. 2, the types of the images formed by the GRIN lens are decided according to the lens length Z, as shown in Table 1. For example, an inverted real image is formed when an object is situated in front of a front focal point of the GRIN lens located within a range of $0<Z<Z_1$; an erecting virtual image is formed when the object is situated between the front focal point and the GRIN lens. Also, when $Z_1 \leq Z$, the types of the formed images are decided according to the position relation between the object and the lens, similarly in a lens having curved surfaces on the object and image sides and a uniform refractive power.

TABLE 1

| Lens length (Z) | Type of image |
| --- | --- |
| $0 < Z < Z_1$ | Inverted real image |
| | Erecting virtual image |
| $Z = Z_1$ | Inverted real image |
| $Z_1 < Z < Z_2$ | Inverted virtual image |
| | Inverted real image |
| $Z = Z_2$ | Inverted real image on end surface |
| $Z_2 < Z < Z_3$ | Erecting real image |
| | Inverted virtual image |
| $Z = Z_3$ | Erecting real image |
| $Z_3 < Z < Z_4$ | Erecting virtual image |
| | Erecting real image |
| $Z = Z_4$ | Erecting real image on end surface |

Implementations according to the present invention will hereinafter be described.

According to a first implementation of the present invention, in a real-image type finder optical system comprising, from the object side, an object lens and an eyepiece, the object lens serves also as an erecting optical system and consists of the GRIN lens.

In the first implementation, since the GRIN lens which forms an erecting image without using a relay lens is employed as the object lens, the length, of the object side of the image surface, of the optical system can largely be reduced. This is because the GRIN lens serves not only as the object lens but also as the erecting optical system such as the relay lens, etc., and thereby, the space conventionally provided for the erecting optical system is no more required. Thus, the realization of a compact finder optical system is enabled.

Moreover, in the above-described first implementation, since the GRIN lens is employed as the object lens and relay lens of the real-image type finder optical system, it is required to employ a GRIN lens having a range of $Z_2 < Z \leq Z_4$ for the purpose of forming an erecting image. The range between $Z_2$ and $Z_3$ and the range between $Z_3$ and $Z_4$ are symmetrical about $Z=Z_3$ at the same focal length. Further, the length of the lens is preferably short, since the shorter the length of the lens is, the less chromatic aberration is produced. Therefore, in the first implementation, it is preferable to employ the GRIN lens having a lens length Z of $Z_2 < Z \leq Z_3$. In other words, it is preferable that the GRIN lens fulfills the following condition:

$$\pi/A^{\frac{1}{2}} < Z \leq 3\pi/(2 \cdot A^{\frac{1}{2}}).$$

Especially, it is preferable to employ a GRIN lens having a length of aproximately $Z_3$ since the variation of the focal length is the least and the focal length error caused by the lens length can be restrained to small.

Embodiments of finder optical systems according to the first implemetation will hereinafter be described referring to the drawings.

Figure 1:
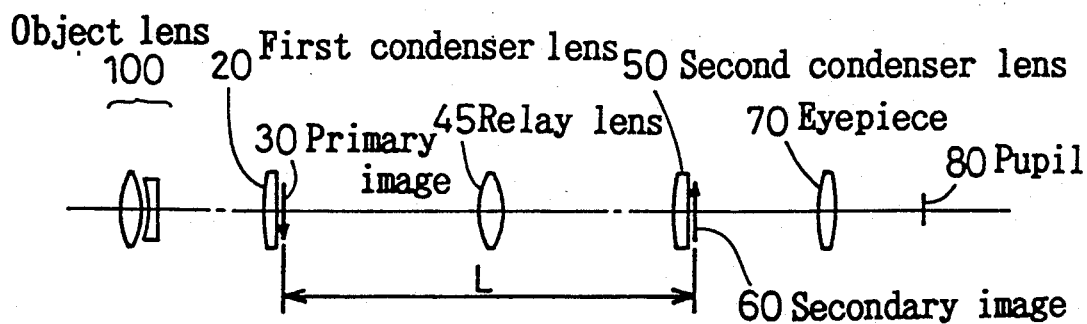
FIG. 1 is a cross-sectional view of a conventional finder optical system.
Figure 3:
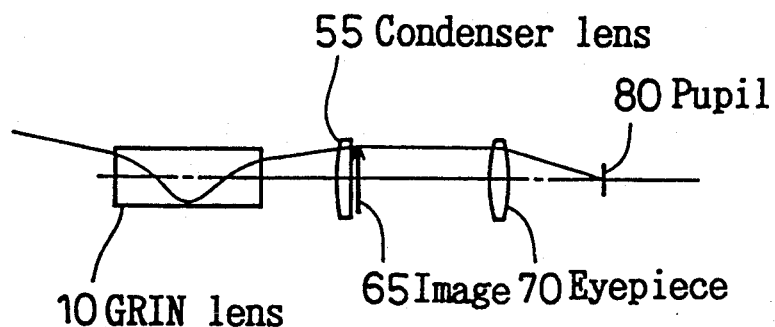
FIGS. 3 to 8 are cross-sectional views of optical systems of a first to sixth embodiments of a first implementation according to the present invention, respectively.

FIG. 3 shows the lens arrangement and optical path of a first embodiment according to the first implementation. The first embodiment as the same arrangement as that of the conventional finder optical system shown in FIG. 1 except that a GRIN lens 10 is employed in place of the object lens 100, the first condenser lens 20 and the relay lens 45 shown in FIG. 1. An image 65 formed by the GRIN lens 10 in the vicinity of a condenser lens 55 is an erecting image.

Figure 4:
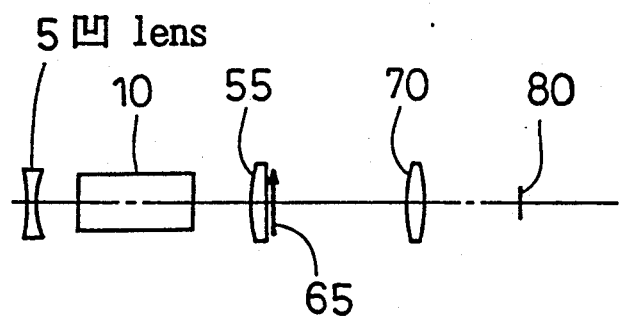

A second embodiment shown in FIG. 4 has the same arrangement as that of the first embodiment except that a concave lens 5 is provided on the object side of the GRIN lens 10. The angel of view can easily be varied if a lens having normal curved surfaces is arranged in front of the GRIN lens 10 as described above.

Hereupon, the maximum incident angle $\theta$ of the GRIN lens 10 is dipicted by the following equation:

$$\sin\theta = (n_0 \cdot A \cdot r^2)^{\frac{1}{2}}$$

which indicates that the maximum incident angle $\theta$ is constant regardless of the focal length. Thus, when a larger angle of view is required, the angle of view can be increased by using the concave lens 5 as in this embodiment.

Figure 5:
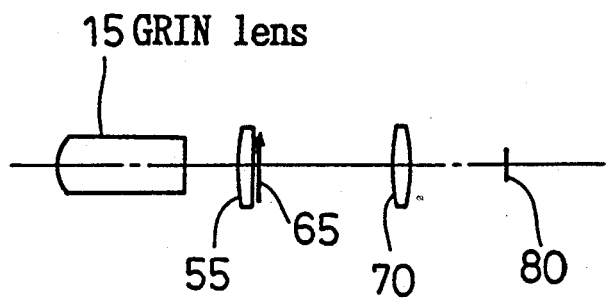

A third embodiment shown in FIG. 5 has the same arrangement as that of the first embodiment except that a GRIN lens 15 whose one end surface is a curved surface is employed in place of the above-described GRIN lens 10. By employing a curved surface for one end surface of a GRIN lens, the total length of the GRIN lens can be reduced. Consequently, the length of the optical path passing through the GRIN lens 15 decreases, which reduces the generation of chromatic aberration. Further, by employing the curved surface, the other aberrations (such as spherical aberration, field curvature, etc.) can also be corrected excellently. This is because if a curved surface is employed for an end surface of the GRIN lens, the degree of freedom in the designing increases, so that the aberrations can advantageously be corrected in the whole finder optical system.

Figure 6:
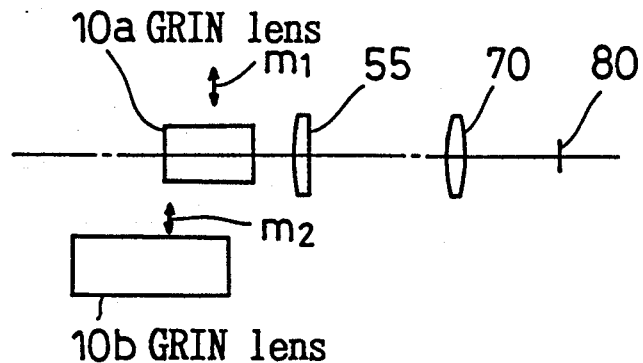

A fourth embodiment shown in FIG. 6 has the same arrangement as that of the first embodiment except that GRIN lenses 10a and 10b having different lens lengths are alternatively inserted on the optical axis in place of the above-described GRIN lens 10. Since the focal length of a GRIN lens varies according to the lens length as described above, it becomes possible to change the magnification of the finder optical system by inserting the GRIN lens 10a or the GRIN lens 10b on the optical axis. The arrows $m_1$ and $m_2$ in FIG. 6 show the movements of the GRIN lenses 10a and 10b alternatively inserted on the optical axis and removed from the optical axis.

Figure 7:
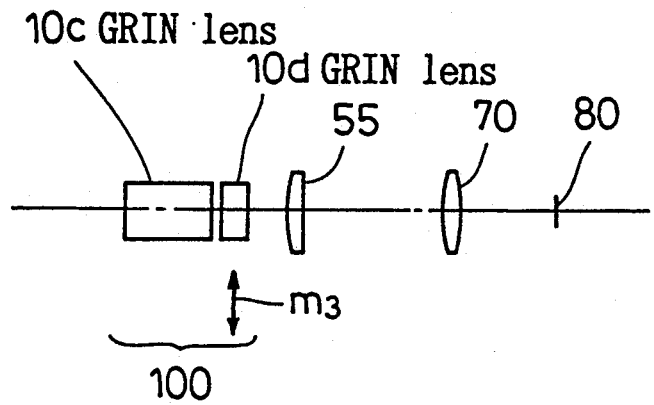

A fifth embodiment shown in FIG. 7 has the same arrangement as that of the first embodiment except that a fixed GRIN lens 10c and a GRIN lens 10d attachable on the optical axis are provided in place of the above-described GRIN lens 10. Since the focal length of the object lens 100 under the condition where the GRIN lens 10d is inserted on the optical axis is different from that under the condition where the GRIN lens 10d is not inserted, it becomes possible to change the magnification of the finder optical system. The arrow $m_3$ in FIG. 7 shows the movement of the GRIN lens 10d inserted on the optical axis and removed from the optical axis.

Figure 8:
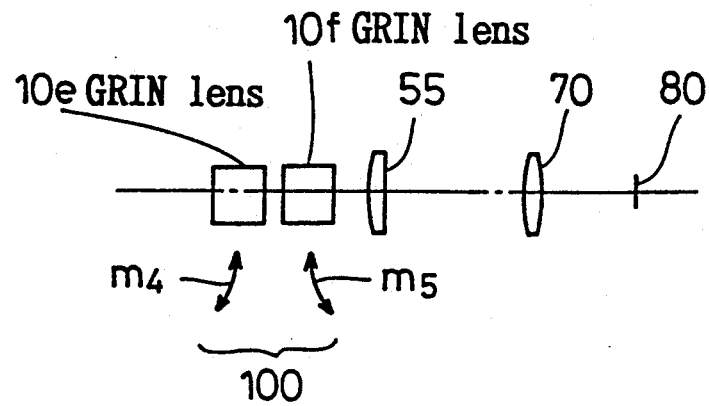

A sixth embodiment shown in FIG. 8 has the same arrangement as that of the first embodiment except that GRIN lenses 10e and 10f movable along the optical axis are provided in place of the above-described GRIN lens 10. Since the focal length of the object lens 100 varies by varying the distance between the GRIN lens 10e and the GRIN lens 10f, it becomes possible to perform a zooming operation in the finder optical system. The arrows m₄ and m₅ in FIG. 8 show the movements of the GRIN lenses 10e and 10f moving along the optical axis to vary the distance between the GRIN lenses 10e and 10f.

Secondly, a second implementation according to the present invention will be described. According to the second implementation, in a real-image type finder optical system comprising, from the object side, an object lens, an erecting optical system and an eyepiece, the object lens consists of one or more GRIN lenses. Therefore, even when the focal length of the object lens should be long, an undesirably long and large size is not required for the object lens consisting of the GRIN lenses. Further, in the designing, in order to decide the focal length of the object lens of the finder optical system after the focal length of the photographing optical system is decided, if the GRIN lenses are employed for the object lens, it is necessary only to change the lens length, and it is unnecessary to consider the variation in aberration.

As the erecting optical system, the relay lens and the Porro prism can be employed. When the relay lens is employed, the length in a direction perpendicular to the optical axis can be reduced, whereas when the Porro prism is employed, the length along the optical axis can be reduced.

In the above-described second implementation, since the GRIN lens is employed as the object lens of the real-image type finder optical system, it is required to employ a GRIN lens having a lens length Z of $0 < Z \leq Z_2$ for the purpose of forming an inverted image as the primary image. The range between 0 and $Z_1$ and the range between $Z_1$ and $Z_2$ are symmetrical about $Z = Z_2$ at the same focal length. Further, the length of the lens is preferably short, since the shorter the lens is, the less chromatic aberration is produced. Therefore, it is preferable to employ a GRIN lens having a lens length of $0 < Z \leq Z_1$ as the object lens. In other words, it is preferable that the GRIN lens fulfills the following condition:

$$Z \leq \pi/(2 \cdot A^{\frac{1}{2}}).$$

Especially, it is preferable to employ a GRIN lens having a length of approximately $Z_1$ since the variation of the focal length is the least and the focal length error caused by the lens length can be restrained to small.

Embodiments of finder optical systems according to the second implementation will hereinafter be described referring to the drawings.

Figure 9:
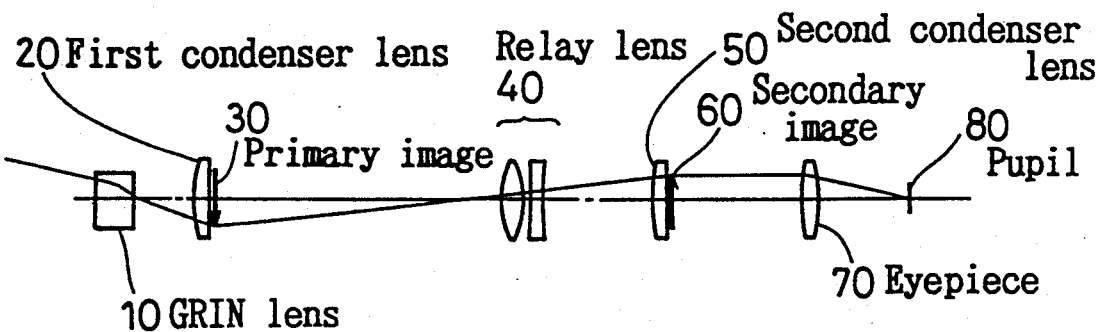
FIGS. 9 to 14 are cross-sectional views of optical systems of a first to sixth embodiments of a second implementation according to the present invention, respectively.

FIG. 9 shows the lens arrangement and optical path of a first embodiment according to the second implementation. The first embodiment has the same arrangement as that of the conventional finder optical system shown in FIG. 1 except that a relay lens 40 having a positive and a negative lens element is employed in place of the relay lens 45 shown in FIG. 1 and that a GRIN lens 10 is employed as the object lens 100 shown in FIG. 1.

Figure 10:
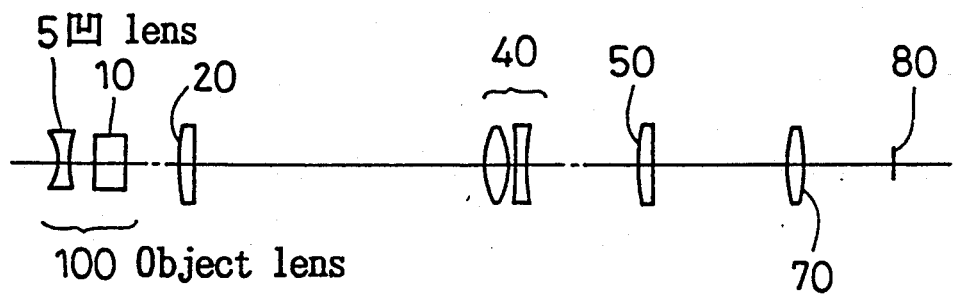

A second embodiment shown in FIG. 10 has the same arrangement as that of the first embodiment of FIG. 9 except that a concave lens 5 and a GRIN lens 10 are employed, from the object side, as the object lens 100. The angle of view can easily be varied if a lens having normal curved surfaces is arranged in front of the GRIN lens 10 as described above.

Figure 11:
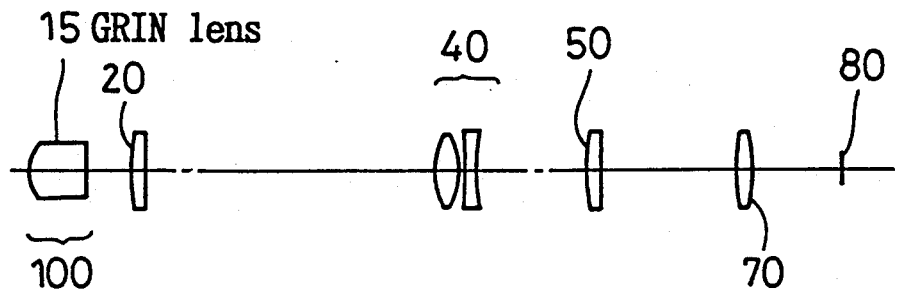

A third embodiment shown in FIG. 11 has the same arrangement as that of the first embodiment of FIG. 9 except that a GRIN lens 15 whose one end surface is a curved surface is employed as the object lens 100 in place of the above-described GRIN lens 10. By employing the curved surface for one end surface of a GRIN lens as described above, the total length of the GRIN lens can be reduced. Consequently, the length of the optical path passing through the GRIN lens 15 decreases, which reduces the generation of chromatic aberration. Further, by employing the curved surface, the other aberrations (such as spherical aberration, field curvature, etc.) can also be corrected excellently. This is because if a curved surface is employed for an end surface of the GRIN lens, the degree of freedom in the designing increases, so that the aberrations can advantageously be corrected in the whole finder optical system.

Figure 12:
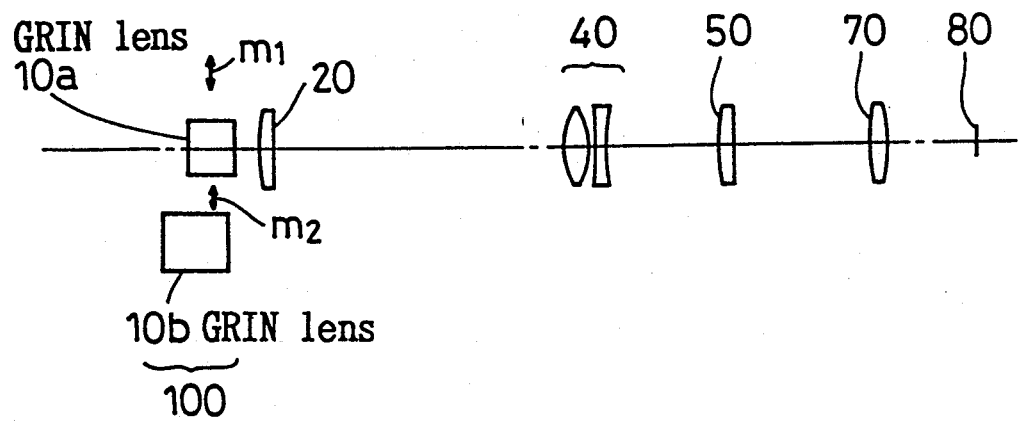

A fourth embodiment shown in FIG. 12 has the same arrangement as that of the first embodiment of FIG. 9 except that GRIN lenses 10a and 10b having different lens lengths are alternatively inserted on the optical axis as the object lens 100. Since the focal length of a GRIN lens varies according to the lens length as described above, it becomes possible to change the magnification of the finder optical system by inserting the GRIN lens 10a or the GRIN lens 10b on the optical axis. The arrows m₁ and m₂ in FIG. 12 show the movements of the GRIN lenses 10a and 10b alternatively inserted on the optical axis and removed from the optical axis.

Figure 13:
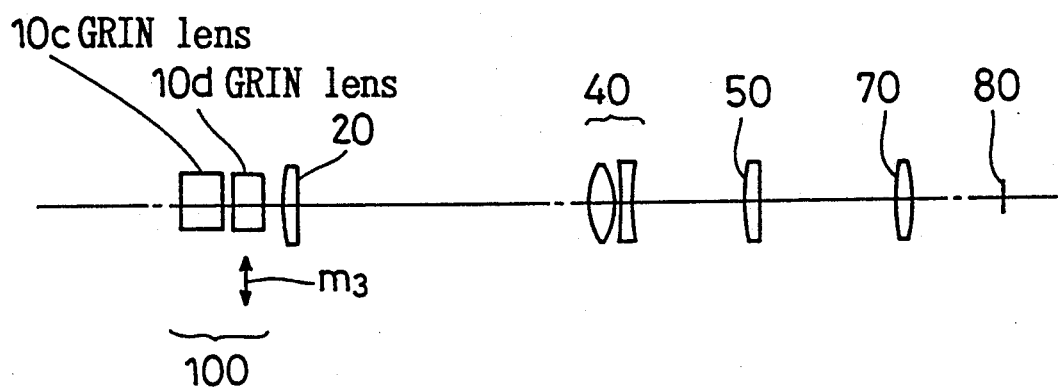

A fifth embodiment shown in FIG. 13 has the same arrangement as that of the first embodiment of FIG. 9 except that a fixed GRIN lens 10c and a GRIN lens 10d attachable on the optical axis are provided as the object lens 100. Since the focal length of the object lens 100 under the condition where the GRIN lens 10d is inserted on the optical axis is different from that under the condition where the GRIN lens 10d is not inserted, it becomes possible to change the magnification of the finder optical system. The arrow m₃ in FIG. 13 shows the movement of the GRIN lens 10d inserted on the optical axis and removed from the optical axis.

Figure 14:
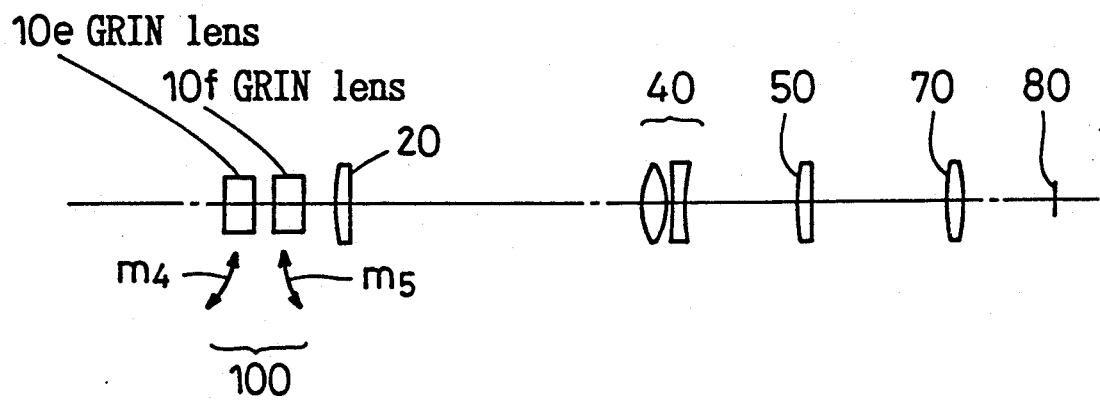

A sixth embodiment shown in FIG. 14 has the same arrangement as that of the first embodiment of FIG. 9 except that GRIN lenses 10e and 10f movable along the optical axis are provided as the object lens 100. Since the focal length of the object lens 100 varies by varying the distance between the GRIN lens 10e and the GRIN lens 10f, it becomes possible to perform a zooming operation in the finder optical system. The arrows m₄ and m₅ in FIG. 14 show the movements of the GRIN lenses 10e and 10f moving along the optical axis to vary the distance between the GRIN lenses 10e and 10f.

Lastly, a third implementation according to the present invention will be described. According to the third implementation, in a real-image type finder optical system comprising, from the object side, an object lens, an erecting optical system including a relay lens and an eyepiece, the relay lens consists of a GRIN lens. Therefore, it is possible to reduce the length of the relay lens while maintaining a required optical performance, which enables the realization of a compact finder optical system.

The GRIN lens, which is employed for the above-described third implementation as the relay lens, is required to re-form an inverted image to erect the inverted image formed by the object lens. The object of the third implementation that an inverted image is formed by a GRIN lens is the same as that of the second implementation. Therefore, the condition to be fulfilled by the lens length Z of the GRIN lens is the same as that of the second implementation.

Embodiments of finder optical systems according to the third implementation will hereinafter be described referring to the drawings.

Figure 15:
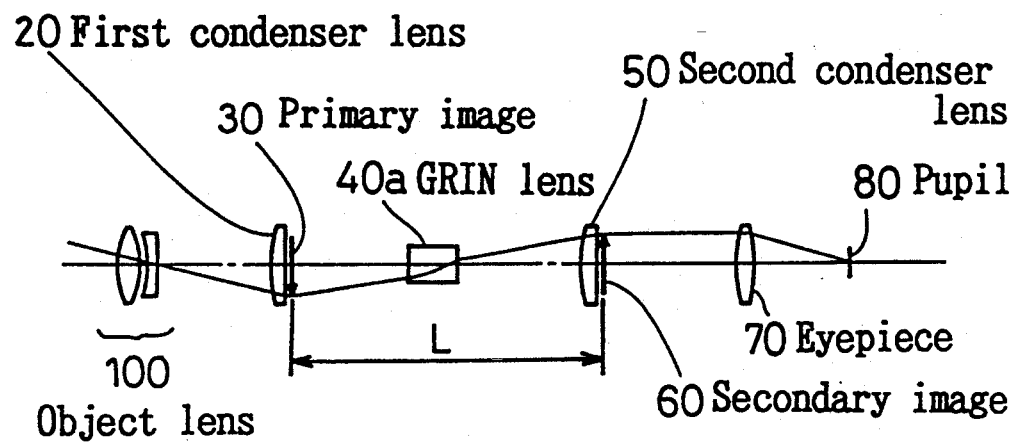
FIGS. 15 to 17 are cross-sectional views of optical systems of a first to third embodiments of a third implementation according to the present invention.

FIG. 15 shows the lens arrangement and optical path of a first embodiment according to the third implementation. The first embodiment has the same arrangement as that of the conventional finder optical system shown in FIG. 1 except that a GRIN lens 40a is employed as a relay lens in place of the relay lens 45 shown in FIG. 1.

By employing a GRIN lens having a short focal length as the relay lens, the length L of the relay part can be reduced while a required optical performance is maintained as shown in FIG. 15.

Figure 16:
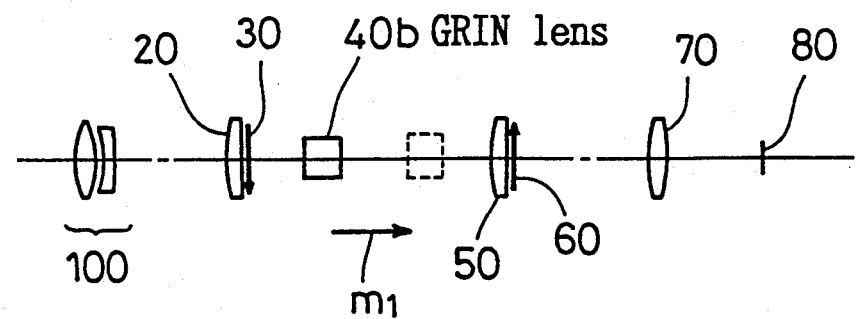

A second embodiment shown in FIG. 16 has the same arrangement as that of the first embodiment of FIG. 15 except that a GRIN lens 40b movable along the optical axis is employed as the relay lens in place of the GRIN lens 40a of the first embodiment. A magnification $B_1$ of the relay part is depicted by y/x, where x represents the distance between a primary image 30 and the GRIN lens 40b and y represents the distance between the GRIN lens 40b and a secondary image 60. Here, when the distance x is replaced with the distance y by moving the GRIN lens 40b to a conjugate position (the arrow $m_1$ shows the movement), the relay magnification is $B_2 = x/y$. Therefore, by moving the GRIN lens 40b as described above, a zooming operation at a relation of $B_2 = 1/B_1$ can be performed. The position of the GRIN lens after it is moved is shown by the dotted line.

Figure 17:
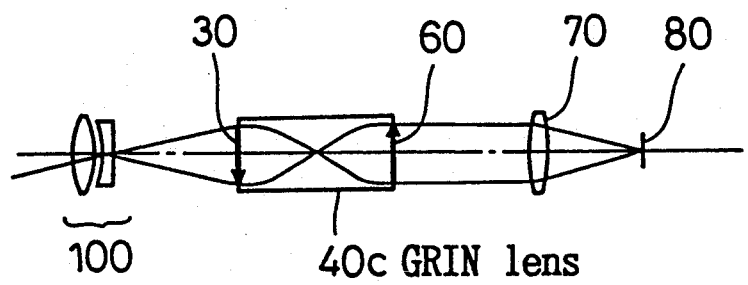

A third embodiment shown in FIG. 17 has the same arrangement as that of the first embodiment of FIG. 15 except that a GRIN lens 40c is employed in place of a first condenser lens 20, the GRIN lens 40a and a second condenser lens 50 of the first embodiment. The length of the GRIN lens 40c is $Z = \pi/A^{\frac{1}{2}}$. Therefore, a primary image 30, which is an inverted image, on the end surface of the lens is formed into a secondary image 60 on the other end surface. Since images are formed on both end surfaces of the lens, condenser lenses are no more required, which enables to reduce the length L of the relay part. Thus, a more compact finder optical system can be realized. Moreover, aberrations are produced on an interface (between the air and glass) where there are a difference of refractive index; however, the quality of an image hardly deteriorates if the image is formed on the interface. Therefore, also the aberration performance can be improved by employing the GRIN lens 40c as described above.

Since the GRIN lenses employed for the present invention are cylindrical, they can easily be held. That is, since the diameter of a lens employed for a finder optical system is usually small, it is difficult to stably hold, with a lens holder, a lens having curved surfaces on the object and image sides and a uniform refractive power. However, when a cylindrical GRIN lens is employed, since the periphery of the lens is wide, a larger part can be held by the lens holder, which facilitates a stable holding of the lens.

Obviously, many modifications and variations of the present invention are possible in light of the above teachings. It is therefore to be understood that within the scope of the appended claims, the invention may be practiced other than as specifically described.

What is claimed is:

1. A finder optical system provided separately from a photo-taking lens, comprising from the object side to the image side;
    an object lens for forming a primary image which is an inverted image of an object, said object lens comprising a gradient index lens and a constant index lens;
    means for erecting the primary image to form an erecting image, and
    an eyepiece for enlarging said erecting image, wherein the constant index lens has a negative refractive power and is arranged at the object side of the gradient index lens.

2. A finder optical system provided separately from a photo-taking lens, comprising from the object side to the image side;
    an object lens for forming a primary image which is an inverted image of an object, said object lens comprising a gradient index lens;
    means for erecting the primary image to form an erecting image, and
    an eyepiece for enlarging said erecting image, wherein the finder optical system has a plurality of gradient index lenses having a different focal length from each other, and only one of the gradient index lenses is arranged on an optical axis of the finder optical system as the object lens.

3. A finder optical system provided separately from a photo-taking lens comprising from the object side to the image side;
    an object lens for forming a primary image which is an inverted image of an object, said object lens comprising a gradient index lens;
    means for erecting the primary image to form an erecting image; and
    an eyepiece for enlarging said erecting image, wherein the object lens comprises two gradient index lenses, one or which is always arranged on the optical axis of the finder optical system, and the other of which is retractably arranged on the optical axis.

4. A finder optical system provided separately from a photo-taking lens, comprising from the object side to the image side;
    a gradient index lens for forming an erecting image of an object, said gradient index lens functioning as an object lens and an image erecting optical system, and
    an eyepiece for enlarging said erecting image.

5. A finder optical system claimed in claim 4, wherein both sides of the gradient index lens are plane surfaces.

6. A finder optical system claimed in claim 4, wherein the gradient index lens has a spherical surface.

7. A finder optical system claimed in claim 4, wherein the object lens further comprises a constant index lens.

8. A finder optical system claimed in claim 7, wherein the constant index lens has a negative refractive power and is arranged at object side of the gradient index lens.

9. A finder optical system claimed in claim 4, wherein the finder optical system has a plurality of gradient index lenses having a different focal length from each other, and only one of the gradient index lenses is arranged on optical axis of the finder optical system as the object lens.

10. A finder optical system claimed in claim 4, wherein the object lens comprises two gradient index lenses, one of which is always arranged on an optical axis of the finder optical system, and other of which is retractably arranged on the optical axis.

11. A finder optical system claimed in claim 4, wherein the gradient index lens shifts along an optical axis of the finder optical system for zooming operation.

12. A finder optical system claimed in claim 4, wherein the gradient index lens is radial gradient index lens.

13. In a camera having a photo-taking lens system, the improvement of a separate finder optical system of a compact configuration, comprising from the object to the image side:

an object lens unit for forming a primary image including a gradient index lens;

means for erecting the primary image to from an erect image, and an eyepiece for enlarging the erect primary image for an observer.

14. The invention of claim 13 wherein the means for erecting includes the gradient index lens and the gradient index lens satisfies the following equation:

$$\pi/A^{\frac{1}{2}} \leq Z < 3\pi/(2 \cdot A^{\frac{1}{2}})$$

wherein Z is the gradient index lens length and A is the gradient index constant.

15. The invention of claim 13 wherein the gradient index lens satisfies the following equation $$Z \leq \pi/(2 \cdot A^{\frac{1}{2}})$$

wherein Z is the gradient index lens length and A is the gradient index constant.

* * * * *